(12) United States Patent
Ko (10) Patent No.: US 12,195,335 B2
(45) Date of Patent: Jan. 14, 2025

(54) FEED GAS REFORMING SYSTEM AND METHOD OF CONTROLLING THE SAME

(71) Applicants: HYUNDAI MOTOR COMPANY, Seoul (KR); KIA CORPORATION, Seoul (KR)

(72) Inventor: Dong Seok Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 498 days.

(21) Appl. No.: 17/409,296

(22) Filed: Aug. 23, 2021

(65) Prior Publication Data

US 2022/0169500 A1 Jun. 2, 2022

(30) Foreign Application Priority Data

Nov. 30, 2020 (KR) .................. 10-2020-0164622

(51) Int. Cl.
*C01B 3/34* (2006.01)
*B01D 53/047* (2006.01)
(Continued)

(52) U.S. Cl.
CPC ............ *C01B 3/346* (2013.01); *B01D 53/047* (2013.01); *B01J 8/1818* (2013.01); *C01B 3/56* (2013.01);
(Continued)

(58) Field of Classification Search
CPC ... C01B 3/346; C01B 3/56; C01B 2203/0222; C01B 2203/042; C01B 2203/1241; C01B 2203/1657; C01B 2203/169; C01B 3/34; C01B 2203/0233; C01B 2203/1628; C01B 3/24; C01B 3/32; C01B 2203/0205; C01B 2203/1235; C01B 2203/1633; C01B 2203/1638; B01D 53/047; B01D 2256/16; B01D 2257/502; B01J 8/1818; B01J 2208/00548
See application file for complete search history.

(56) References Cited

U.S. PATENT DOCUMENTS

2008/0005963 A1* 1/2008 Wheat ................... C01B 3/382
48/61
2012/0208099 A1* 8/2012 Chen ...................... C01B 3/384
423/650

FOREIGN PATENT DOCUMENTS

JP 6530122 B1 5/2019
KR 10-0992868 B 11/2010
(Continued)

*Primary Examiner* — Wayne A Langel
*Assistant Examiner* — Syed T Iqbal
(74) *Attorney, Agent, or Firm* — Fox Rothschild LLP (57) ABSTRACT

A feed gas reforming system is provided. The system includes a reformer configured to receive feed gas and supply water and to produce and discharge mixed gas including hydrogen, a pressure swing absorber (PSA) configured to receive the mixed gas and to refine and discharge hydrogen gas, a feed gas supply unit configured to control the supply amount of feed gas, a supply water supply unit configured to control the supply amount of supply water, a hydrogen gas supply unit configured to control the amount of hydrogen gas, and a control unit configured to control the flow rate of hydrogen gas, to control the feed gas supply unit based on the pressure of the discharged hydrogen gas, and to control the supply water supply unit based on the flow rate of feed gas.

9 Claims, 3 Drawing Sheets

(51) Int. Cl.
*B01J 8/18* (2006.01)
*C01B 3/56* (2006.01)
(52) U.S. Cl.
CPC . *B01D 2256/16* (2013.01); *B01J 2208/00548* (2013.01); *C01B 2203/0222* (2013.01); *C01B 2203/042* (2013.01); *C01B 2203/1241* (2013.01); *C01B 2203/1657* (2013.01); *C01B 2203/169* (2013.01)

(56) References Cited

FOREIGN PATENT DOCUMENTS

| | | |
|---|---|---|
| KR | 10-1277123 B1 | 6/2013 |
| KR | 10-2019-0127713 | 11/2019 |

* cited by examiner

FEED GAS REFORMING SYSTEM AND METHOD OF CONTROLLING THE SAME

CROSS-REFERENCE TO RELATED APPLICATION

This application claims the priority to and the benefit of Korean Patent Application No. 10-2020-0164622, filed on Nov. 30, 2020, the disclosure of which is herein incorporated by reference in its entirety.

TECHNICAL FIELD

The present disclosure relates to a reforming system capable of producing hydrogen gas used in a hydrogen fuel cell from natural gas including methane and a method of controlling the same.

BACKGROUND

With an increase in pollution due to greenhouse gases all over the world, methods of producing or using electric power without discharging greenhouse gases, such as $CO_2$, have attracted attention. Typically, solar energy or wind energy is used, and production of electric power using hydrogen gas is one of the typical methods.

A hydrogen fuel cell generates electricity using energy generated during oxidation and reduction between hydrogen and oxygen. Since water ($H_2O$) is generated as a byproduct, the hydrogen fuel cell has been spotlighted as environmentally friendly energy and much research thereon has been conducted.

Since little hydrogen gas ($H_2$) exists in air, however, it is necessary to provide a method of producing pure hydrogen gas. Hydrogen gas may be obtained by reforming hydrocarbon, ammonia, etc. When hydrocarbon is reformed, however, $CO_2$ may be generated. For this reason, hydrocarbon does not appropriately serve as an energy source that does not discharge carbon during production of hydrogen gas to be used as a fuel.

Consequently, it is necessary to prevent $CO_2$ from being generated when hydrocarbon is reformed. As a result, technology for collecting, storing, and recycling $CO_2$ generated or reforming methods of producing hydrogen while removing $CO_2$ have been developed.

Although reforming methods are developed, however, it is possible for an operator to operate a reforming system based only on a value set according to the demand quantity in order to adjust the flow rate of hydrogen gas demanded by a consumer, and the reforming system is manually controlled.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides a reforming system capable of automatically controlling a process based on the supply amount of hydrogen gas demanded by a consumer and a method of controlling the same.

In accordance with an aspect of the present disclosure, the above and other objects can be accomplished by the provision of a feed gas reforming system including a reformer configured to receive feed gas and supply water and to produce and discharge mixed gas including hydrogen, a pressure swing absorber (PSA) configured to receive the mixed gas from the reformer and to refine and discharge hydrogen gas, a feed gas supply unit configured to control the supply amount of feed gas, a supply water supply unit configured to control the supply amount of supply water, a hydrogen gas supply unit configured to control the amount of hydrogen gas discharged from the PSA, and a control unit configured to control the flow rate of hydrogen gas discharged through control of the hydrogen gas supply unit, to control the feed gas supply unit based on the pressure of the discharged hydrogen gas, and to control the supply water supply unit based on the flow rate of feed gas discharged through control of the feed gas supply unit.

The control unit may include a hydrogen gas controller configured to control the hydrogen gas supply unit based on the flow rate or pressure of hydrogen gas discharged from the PSA or to control the hydrogen gas supply unit according to a signal transmitted from outside.

The control unit may include a feed gas controller configured to control the feed gas supply unit based on the flow rate of feed gas or the pressure of hydrogen gas discharged from the PSA.

The control unit may include a supply water controller configured to control the supply water supply unit based on the flow rate of feed gas.

The hydrogen gas controller may include a first flow sensor configured to measure the flow rate of hydrogen gas discharged from the PSA and a first flow indicator controller configured to control the hydrogen gas supply unit based on the measured flow rate or to control the hydrogen gas supply unit according to a signal transmitted from outside, wherein the first flow indicator controller may perform control such that the hydrogen gas supply unit discharges a uniform flow rate of hydrogen gas.

The hydrogen gas controller may further include a first pressure sensor configured to measure the pressure of hydrogen gas discharged from the PSA and a first pressure indicator controller configured to control the hydrogen gas supply unit based on the measured pressure, wherein, in the case in which the hydrogen gas supply unit is not controlled by the first flow indicator controller, the hydrogen gas supply unit may be controlled by the first pressure indicator controller such that hydrogen gas is discharged at a uniform pressure.

The feed gas controller may include a second pressure indicator controller configured to control the feed gas supply unit based on the pressure of hydrogen gas discharged from the PSA, wherein the second pressure indicator controller may perform control such that the feed gas supply unit supplies feed gas at a flow rate corresponding to the pressure of hydrogen gas.

The feed gas controller may further include a second flow sensor configured to measure the flow rate of feed gas and a second flow indicator controller configured to control the feed gas supply unit based on the flow rate of feed gas measured by the second flow sensor, wherein, in the case in which the feed gas supply unit is not controlled by the second pressure indicator controller, the feed gas supply unit may be controlled by the second flow indicator controller such that a uniform flow rate of feed gas is supplied to the reformer.

The supply water controller may include a third flow indicator controller configured to perform control such that the supply water supply unit discharges supply water in proportion to the flow rate of feed gas.

The supply water controller may further include a third flow sensor configured to measure the flow rate of supply water, wherein the third flow indicator controller may perform control such that the supply water supply unit supplies a uniform flow rate of supply water according to the flow rate of supply water measured by the third flow sensor.

In accordance with another aspect of the present disclosure, there is provided a method of controlling the feed gas reforming system, the method including supplying feed gas, supplying supply water, the reformer receiving the feed gas and the supply water and producing and discharging mixed gas including hydrogen, the PSA receiving the mixed gas from the reformer and refining and discharging hydrogen gas, the control unit controlling the hydrogen gas supply unit to adjust the amount of hydrogen gas discharged from the PSA, the control unit controlling the feed gas supply unit based on the pressure of hydrogen gas changed as the result of the hydrogen gas supply unit being controlled, and the control unit controlling the supply water supply unit based on the flow rate of feed gas changed as the result of the feed gas supply unit being controlled.

DRAWINGS

The above and other objects, features and other advantages of the present disclosure will be more clearly understood from the following detailed description taken in conjunction with the accompanying drawings, in which.

DETAILED DESCRIPTION

Specific structural or functional descriptions of the forms of the present disclosure disclosed in this specification or this disclosure are given only for illustrating some forms of the present disclosure. Some forms of the present disclosure may be realized in various forms, and should not be interpreted to be limited to some forms of the present disclosure disclosed in this specification or this disclosure.

Since some forms of the present disclosure may be variously modified and may have various forms, specific forms will be shown in the drawings and will be described in detail in this specification or this disclosure. However, some forms of the present disclosure are not limited to such specific forms, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific forms, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Reference will now be made in detail to the preferred forms of the present disclosure, examples of which are illustrated in the accompanying drawings. Wherever possible, the same reference numbers will be used throughout the drawings to refer to the same or like parts.

Figure 1:
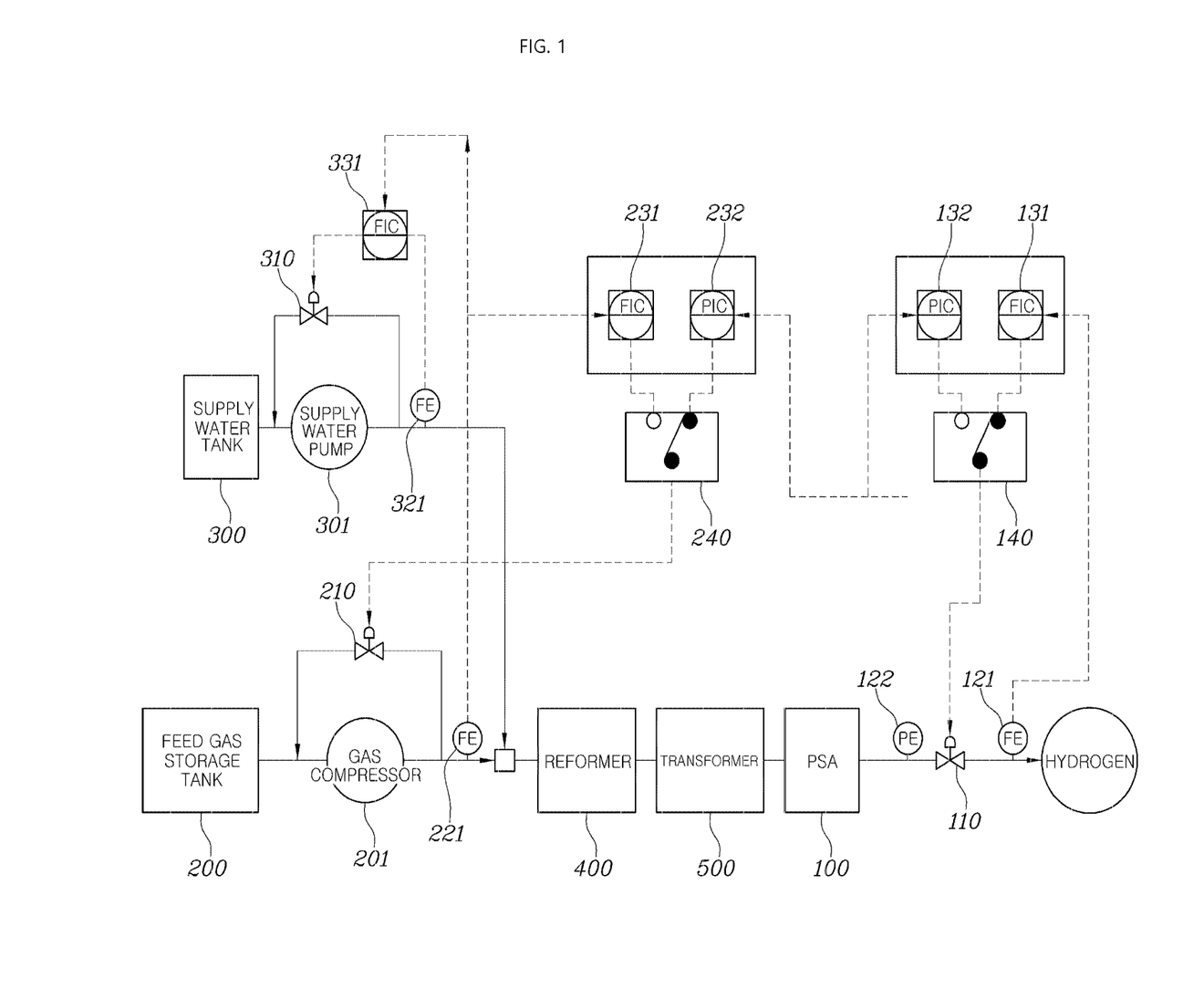
FIGS. 1 and 2 are circuit diagrams of a feed gas reforming system in one form of the present disclosure.
Figure 2:
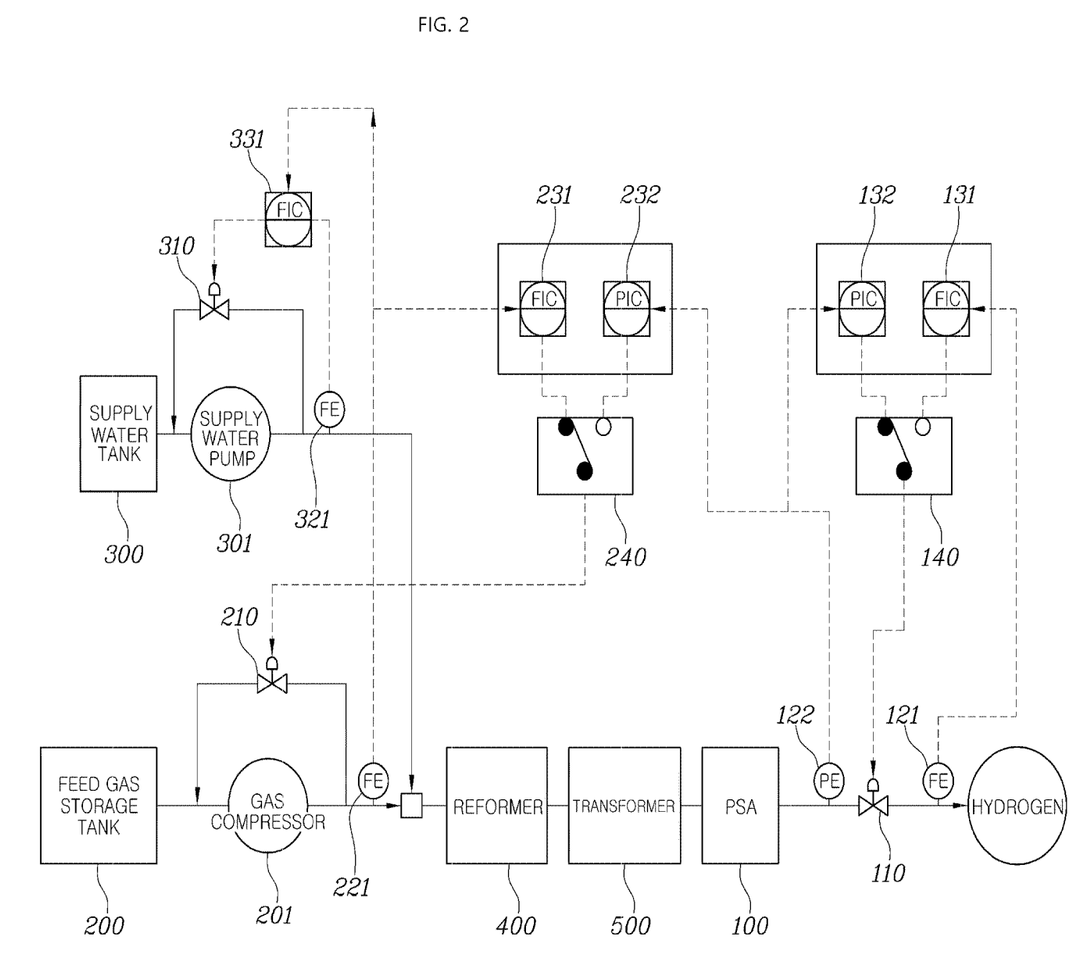
Figure 3:
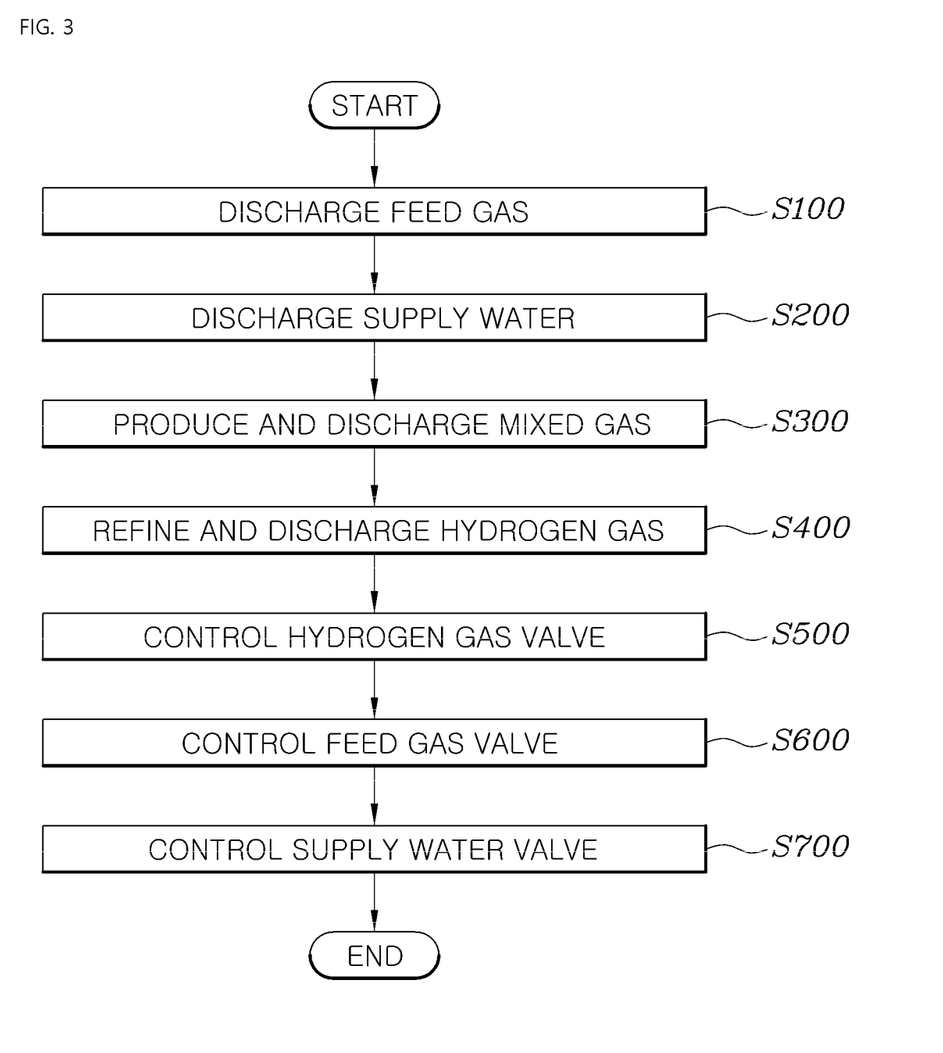
FIG. 3 is a flowchart showing a method of controlling a feed gas reforming system in one form of the present disclosure.

FIGS. 1 and 2 are circuit diagrams of a feed gas reforming system in some forms of the present disclosure, and FIG. 3 is a flowchart showing a method of controlling a feed gas reforming system in some forms of the present disclosure.

Referring to FIGS. 1 and 2, the feed gas reforming system in some forms of the present disclosure includes a reformer 400 configured to receive feed gas and supply water and to produce and discharge mixed gas including hydrogen, a pressure swing absorber (PSA) 100 configured to receive the mixed gas from the reformer and to refine and discharge hydrogen gas, a feed gas supply unit configured to control the supply amount of feed gas, a supply water supply unit configured to control the supply amount of supply water, a hydrogen gas supply unit configured to control the amount of hydrogen gas discharged from the PSA, and a control unit configured to control the flow rate of hydrogen gas discharged through control of the hydrogen gas supply unit, to control the feed gas supply unit based on the pressure of the discharged hydrogen gas, and to control the supply water supply unit based on the flow rate of feed gas discharged through control of the feed gas supply unit.

Specifically, the basic process of the present disclosure is to produce hydrogen gas without generating $CO_2$. To this end, a gas compressor 201 discharges feed gas including methane, and a supply water pump 301 discharges supply water. The two materials are mixed and supplied to the reformer, in which the mixed materials react with each other under high temperature/high pressure conditions. As a result, the reformer produces hydrogen. At this time, highly refined ultrapure water is preferably used as the supply water.

The produced hydrogen gas contains impurities, such as CO. Consequently, the pressure swing absorber (PSA) may refine the hydrogen gas, and may discharge pure hydrogen. At this time, a transformer may be further provided between the reformer and the PSA in order to produce hydrogen through further reaction of CO, which is well known.

In this system, the flow rate of feed gas is calculated first, and the supply amount of supply water is determined based on the calculated flow rate. In general, supply water is supplied in an amount equivalent to 3 times the flow rate of feed gas. That is, conventionally, only determination of the flow rate of supply water based on the flow rate of feed gas supplied is performed as control necessary to operate the feed gas reforming system.

In this system, only the input of a reactant is controlled. As a result, it is difficult to flexibly perform the process depending on the demand quantity of a consumer who receives hydrogen gas, and it is necessary to manually adjust the process whenever the demand quantity is changed.

In some forms of the present disclosure, a supply unit configured to adjust the flow rate or pressure of a reactant and a product and a control unit configured to control the supply unit are provided, and therefore the process is automatically controlled when the demand quantity of hydrogen gas is changed, whereby it is possible to solve the above problems.

Specifically, the supply unit includes a feed gas supply unit configured to control the supply amount of feed gas, a supply water supply unit configured to control the supply amount of supply water, and a hydrogen gas supply unit configured to control the discharge amount of hydrogen, and the supply amounts may be controlled through RPM control of the compressor 201 and the pump 301, bypass valve control of valves 110, 201, and 301, and guide vane control. In this specification, the case in which the valves 110, 201, and 301 are controlled to control the supply amounts of feed gas, supply water, and hydrogen is described with reference to the drawings in some forms of the present disclosure. That is, in this specification, the feed gas supply unit, the supply water supply unit, and the hydrogen gas supply unit may be a feed gas valve, a supply water valve, and a hydrogen gas valve, respectively, in some forms of the present disclosure. In order to control the supply amounts, the valves or one or more of the compressor and the pump may be controlled.

In addition, a separate line configured to receive feed gas and supply water may be further included in order to receive the feed gas and the supply water, or feed gas and supply water may be received from separate storage tanks. In this specification, the case in which feed gas and supply water are received from a feed gas storage tank 200 and a supply water tank 300 is described in some forms of the present disclosure.

Hereinafter, a mechanism of controlling the feed gas reforming system in some forms of the present disclosure will be described.

The control unit may include a hydrogen gas controller configured to control the hydrogen gas supply unit based on the flow rate or pressure of hydrogen gas discharged from the PSA or to control the hydrogen gas supply unit according to a signal transmitted from outside.

As mentioned above, the supply units may be controlled through control of the compressor, the pump, and the valves, whereby supply amounts may be adjusted.

Consequently, control of the hydrogen gas supply unit means control of the hydrogen gas valve.

Specifically, the hydrogen gas controller may measure the pressure or flow rate of hydrogen gas discharged to control the hydrogen gas valve 110, or in the case in which the demand quantity is changed, a hydrogen gas supplier may set a target flow rate or pressure of hydrogen gas to the hydrogen gas controller to control the hydrogen gas valve 110. For example, on the assumption that the demand quantity is reduced, the hydrogen gas controller may control the hydrogen gas valve so as to be closed to some extent at the outside, whereby the supply amount of hydrogen gas is reduced.

The hydrogen gas controller may measure the pressure or flow rate of hydrogen gas discharged to control the hydrogen gas valve in addition to an external signal. Specifically, in the case in which the valve controlled to discharge a predetermined amount of hydrogen gas discharges a larger or smaller amount of hydrogen gas than the predetermined amount of hydrogen gas, the hydrogen gas controller may sense the same, and may perform control such that the hydrogen gas valve is further closed or opened to some extent. That is, the hydrogen gas controller may be feedback controlled.

The control unit may include a feed gas controller configured to control the feed gas supply unit based on the flow rate of feed gas or the pressure of hydrogen gas discharged from the PSA.

As mentioned above, the supply units may be controlled through control of the compressor, the pump, and the valves, whereby supply amounts may be adjusted.

Consequently, control of the feed gas supply unit means control of the feed gas valve.

Specifically, the feed gas valve 210 adjusts the flow rate of feed gas discharged under control of the feed gas controller. The feed gas controller controls the feed gas valve 210 based on the pressure of hydrogen gas discharged from the PSA. For example, in the case in which the demand quantity of a consumer is reduced, the hydrogen gas controller controls the hydrogen gas valve so as to be closed to some extent, whereby the pressure of hydrogen gas at the rear end of the PSA is increased. In this case, the feed gas controller, upon receiving a signal about the pressure of hydrogen gas, performs control such that the flow rate of feed gas is reduced in order to reduce hydrogen gas production, whereby the feed gas valve is closed to some extent.

In addition, the feed gas controller may control the feed gas valve based on the flow rate of feed gas discharged from a feed gas storage tank. Consequently, the feed gas controller may be feedback controlled in the same manner as the hydrogen gas controller.

Meanwhile, the control unit may include a supply water controller configured to control the supply water supply unit based on the flow rate of feed gas.

As mentioned above, the supply units may be controlled through control of the compressor, the pump, and the valves, whereby supply amounts may be adjusted.

Consequently, control of the supply water supply unit means control of the supply water valve.

Specifically, the supply water valve 310 adjusts the flow rate of supply water based on the flow rate of feed gas. The supply water controller controls the supply water valve 310 based on the flow rate of feed gas discharged from the feed gas storage tank. Feed gas and supply water react with each other at a predetermined ratio. In the case in which the amount of supply water is too large or too small, therefore, it is difficult to uniformly generate hydrogen gas. In general, supply water is supplied in an amount equivalent to 3 times the flow rate of feed gas.

In addition, the supply water controller may control the supply water valve based on the flow rate of supply water discharged from the supply water supply tank. Consequently, the supply water controller may be feedback controlled in the same manner as the hydrogen gas controller and the feed gas controller.

More specifically, each controller of the control unit may include the following construction. FIGS. 1 and 2 are circuit diagrams of a feed gas reforming system in some forms of the present disclosure. In FIGS. 1 and 2, FE (flow element) indicates a flow sensor, PE (pressure element) indicates a pressure sensor, FIC indicates a flow indicator controller, and PIC indicates a pressure indicator controller.

Referring to FIGS. 1 and 2, the hydrogen gas controller may include a first flow sensor 121 configured to measure the flow rate of hydrogen gas discharged from the PSA and a first flow indicator controller 131 configured to control the hydrogen gas supply unit based on the measured flow rate or to control the hydrogen gas supply unit according to a signal transmitted from outside. The first flow indicator controller may perform control such that the hydrogen gas supply unit discharges a uniform flow rate of hydrogen gas.

The control and feedback control of the hydrogen gas valve may be performed by the first flow sensor 121 and the first flow indicator controller 131.

Meanwhile, the hydrogen gas controller may further include a first pressure sensor 122 configured to measure the pressure of hydrogen gas discharged from the PSA and a first pressure indicator controller 132 configured to control the hydrogen gas supply unit based on the measured pressure. In the case in which the hydrogen gas supply unit is not controlled by the first flow indicator controller, the hydrogen gas supply unit may be controlled by the first pressure indicator controller such that hydrogen gas is discharged at a uniform pressure.

The hydrogen gas controller may measure not only the flow rate of hydrogen gas but also the pressure of hydrogen gas. The hydrogen gas controller may control the hydrogen gas valve based on the measured pressure such that hydrogen gas is discharged at a uniform pressure. In this case, a switch 140 of the hydrogen gas controller operates the first pressure indicator controller 132, whereby the hydrogen gas valve is not controlled by the first flow indicator controller 131 but the hydrogen gas valve is controlled by the first pressure indicator controller 132.

Specifically, feed gas includes hydrocarbon gas, such as methane, ethane, propane, or butane. In the case in which the composition of feed gas is uniform and there is no element that disturbs the progress of other processes, the process is easily controlled. In the case in which disturbance occurs, for example, the composition of feed gas is changed, the amount of hydrogen gas is changed even though the flow rate of feed gas is uniform. Therefore, system control in the case in which frequent disturbance occurs is also necessary.

In the case in which frequent disturbance occurs, hydrogen gas may be discharged at a uniform pressure using the above control mechanism, whereby the feed gas reforming system may be stably operated. The hydrogen gas valve is controlled by the first pressure indicator controller, and the first pressure sensor measures the pressure of hydrogen gas discharged from the PSA. The pressure measured by the first pressure sensor is transmitted to the first pressure indicator controller, and the first pressure indicator controller controls the hydrogen gas valve based on information about the received pressure of hydrogen gas. That is, feedback control may be performed such that a uniform target pressure is maintained.

The feed gas controller may include a second pressure indicator controller 232 configured to control the feed gas supply unit based on the pressure of hydrogen gas discharged from the PSA. The second pressure indicator controller 232 may perform control such that the feed gas supply unit supplies feed gas at a flow rate corresponding to the pressure of hydrogen gas.

The control and feedback control of the feed gas valve may be performed by the second pressure indicator controller 232.

The feed gas controller may further include a second flow sensor 221 configured to measure the flow rate of feed gas and a second flow indicator controller 231 configured to control the feed gas supply unit based on the flow rate of feed gas measured by the second flow sensor. In the case in which the feed gas supply unit is not controlled by the second pressure indicator controller, the feed gas supply unit may be controlled by the second flow indicator controller such that a uniform flow rate of feed gas is supplied to the reformer.

The feed gas controller may measure not only the pressure of hydrogen gas but also the flow rate of feed gas. The hydrogen gas controller may control the feed gas valve 210 based on the measured flow rate of feed gas such that a uniform flow rate of feed gas is discharged. In this case, a switch 240 of the feed gas controller operates the second flow indicator controller 231, whereby the feed gas valve is not controlled by the second pressure indicator controller 232 but the feed gas valve is controlled by the second flow indicator controller 231.

Specifically, in the case in which frequent disturbance occurs, feed gas may be discharged at a uniform pressure using the above control mechanism, whereby the feed gas reforming system may be stably operated. The feed gas valve is controlled by the second flow indicator controller, and the second flow sensor measures the flow rate of feed gas discharged from the feed gas storage tank. The flow rate measured by the second flow sensor is transmitted to the second flow indicator controller, and the second flow indicator controller controls the feed gas valve based on information about the received flow rate of feed gas. That is, feedback control may be performed such that a uniform target flow rate is maintained.

In the case in which frequent disturbance occurs, therefore, the hydrogen gas controller controls the hydrogen gas valve such that hydrogen gas is discharged at a uniform pressure, and the feed gas controller controls the feed gas valve based on only the flow rate of feed gas irrespective of the pressure of hydrogen gas discharged from the PSA, whereby the process is stably performed.

The supply water controller may include a third flow indicator controller 331 configured to perform control such that the supply water supply unit discharges supply water in proportion to the flow rate of feed gas.

In general, supply water is supplied in an amount equivalent to 3 times the flow rate of feed gas. Consequently, the supply water controller receives information about the flow rate of feed gas from the second flow sensor to control the supply water valve such that supply water is supplied at a target flow rate.

In addition, the supply water controller may further include a third flow sensor 321 configured to measure the flow rate of supply water. The third flow indicator controller may perform control such that the supply water supply unit supplies a uniform flow rate of supply water according to the flow rate of supply water measured by the third flow sensor.

Specifically, in the case in which the flow rate of supply water is too high or too low, it is necessary to readjust the flow rate of supply water. To this end, a third flow sensor 321 configured to measure the flow rate of supply water is provided. The third flow sensor 321 transmits information about the flow rate of supply water to the third flow indicator controller 331 such that the third flow indicator controller controls the supply water valve 310. That is, the supply water controller may also be feedback controlled.

FIG. 3 is a flowchart showing a method of controlling a feed gas reforming system in some forms of the present disclosure.

The method of controlling the feed gas reforming system in some forms of the present disclosure includes a step (S100) of supplying feed gas, a step (S200) of supplying supply water, a step (S300) of the reformer receiving the feed gas and the supply water and producing and discharging mixed gas including hydrogen, a step (S400) of the PSA receiving the mixed gas from the reformer and refining and discharging hydrogen gas, a step (S500) of the control unit controlling the hydrogen gas supply unit to adjust the amount of hydrogen gas discharged from the PSA, a step (S600) of the control unit controlling the feed gas supply unit based on the pressure of hydrogen gas changed as the result of the hydrogen gas supply unit being controlled, and a step (S700) of the control unit controlling the supply water supply unit based on the flow rate of feed gas changed as the result of the feed gas supply unit being controlled.

The system control method in some forms of the present disclosure described above has effects in that it is possible to automate the feed gas reforming system, which is manually controlled in a conventional art, to flexibly operate the feed gas reforming system based on the demand quantity of a hydrogen gas consumer, and to stably perform the process even in the case in which frequent disturbance occurs.

As is apparent from the above description, in some forms of the present disclosure, it is possible to adjust the amount of hydrogen gas produced through automatic control of the system based on the demand quantity of hydrogen gas that is demanded by a consumer and to uniformly adjust the amount of hydrogen gas even in the case in which frequent disturbance occurs, for example, when the content of methane, ethane, propane, or butane is changed.

Although some forms of the present disclosure have been described above with reference to the accompanying drawings, those skilled in the art will appreciate that the present disclosure can be implemented in various other forms without changing the technical ideas or features thereof.

What is claimed is:

1. A feed gas reforming system comprising:
   a reformer configured to:
      receive feed gas and supply water; and
      produce and discharge mixed gas including hydrogen;
   a pressure swing absorber (PSA) configured to:
      receive the mixed gas from the reformer; and
      refine and discharge hydrogen gas;
   a feed gas supply unit configured to control a supply amount of the feed gas;
   a supply water supply unit configured to control a supply amount of the supply water;
   a hydrogen gas supply unit configured to control an amount of the hydrogen gas discharged from the PSA; and
   a control unit configured to:
      control a flow rate of the hydrogen gas discharged through the hydrogen gas supply unit;
      control the feed gas supply unit based on a pressure of the discharged hydrogen gas; and
      control the supply water supply unit based on a flow rate of the feed gas discharged through the feed gas supply unit,
   wherein the control unit further comprises a hydrogen gas controller configured to:
      control the hydrogen gas supply unit based on a flow rate or pressure of the hydrogen gas discharged from the PSA; and
      control the hydrogen gas supply unit according to a signal transmitted from outside,
   wherein the hydrogen gas controller further comprises:
      a first pressure sensor configured to measure the pressure of the hydrogen gas discharged from the PSA; and
      a first pressure indicator controller configured to control the hydrogen gas supply unit based on the measured pressure,
   wherein when a disturbance occurs in which a composition of the feed gas is changed, the control unit controls the hydrogen gas supply unit to discharge the hydrogen gas at a uniform pressure.

2. The feed gas reforming system according to claim 1, wherein the control unit further comprises:
   a feed gas controller configured to control the feed gas supply unit based on the flow rate of the feed gas or the pressure of the hydrogen gas discharged from the PSA.

3. The feed gas reforming system according to claim 2, wherein the feed gas controller further comprises:
   a second pressure indicator controller configured to:
      control the feed gas supply unit based on the pressure of the hydrogen gas discharged from the PSA; and
      control the feed gas supply unit to supply the feed gas at a flow rate corresponding to the pressure of the hydrogen gas.

4. The feed gas reforming system according to claim 3, wherein the feed gas controller further comprises:
   a second flow sensor configured to measure the flow rate of the feed gas; and
   a second flow indicator controller configured to:
      control the feed gas supply unit based on the flow rate of the feed gas; and
      when the second flow indicator controller does not control the feed gas supply unit, control the feed gas supply unit to supply a uniform flow rate of the feed gas to the reformer.

5. The feed gas reforming system according to claim 1, wherein the control unit further comprises:
   a supply water controller configured to control the supply water supply unit based on the flow rate of the feed gas.

6. The feed gas reforming system according to claim 5, wherein the supply water controller further comprises:
   a third flow indicator controller configured to control the supply water supply unit to discharge the supply water in proportion to the flow rate of the feed gas.

7. The feed gas reforming system according to claim 6, wherein the supply water controller further comprises:
   a third flow sensor configured to measure the flow rate of supply water, wherein the third flow indicator controller is configured to control the supply water supply unit to supply a uniform flow rate of the supply water according to the flow rate of the supply water measured by the third flow sensor.

8. The feed gas reforming system according to claim 1, wherein the hydrogen gas controller further comprises:
   a first flow sensor configured to measure the flow rate of the hydrogen gas discharged from the PSA; and
   a first flow indicator controller configured to:
      control the hydrogen gas supply unit based on the measured flow rate;
      control the hydrogen gas supply unit according to a signal transmitted from outside; and control the hydrogen gas supply unit to discharge a uniform flow rate of the hydrogen gas.

9. The feed gas reforming system according to claim 8, wherein when the first flow indicator controller does not control the hydrogen gas supply unit, the first pressure indicator controller controls the hydrogen gas supply unit to discharge the hydrogen gas at the uniform pressure.

* * * * *